United States Patent [19]
Yang

[11] Patent Number: 5,253,087
[45] Date of Patent: Oct. 12, 1993

[54] HOLOGRAPHIC LASER BEAM SCANNING APPARATUS

[75] Inventor: Keun Y. Yang, Seoul, Rep. of Korea

[73] Assignee: Gold Star Co., Ltd., Seoul, Rep. of Korea

[21] Appl. No.: 806,253

[22] Filed: Dec. 13, 1991

[30] Foreign Application Priority Data

Dec. 22, 1990 [KR] Rep. of Korea .............. 20560/1990

[51] Int. Cl.$^5$ .......................... G02B 5/32; G02B 26/10
[52] U.S. Cl. ........................................ 359/16; 359/18; 359/209
[58] Field of Search ........................ 359/16, 17, 18, 15, 359/14, 13, 209

[56] References Cited

U.S. PATENT DOCUMENTS 4,957,336 9/1990 Hasegawa et al. .................... 359/17
4,981,332 1/1991 Smith ................................ 359/15 X

FOREIGN PATENT DOCUMENTS 0062545 10/1982 European Pat. Off. ............ 359/209
0214018 3/1987 European Pat. Off. ............ 359/18

Primary Examiner—Rodney B. Bovernick
Assistant Examiner—David R. Parsons
Attorney, Agent, or Firm—Spencer, Frank & Schneider

[57] ABSTRACT

A holographic laser beam scanning apparatus capable of removing astigmatism created by a hologram disc of the apparatus due to discordance of wave fronts of the laser beams, thereby allowing precise scanning to be effected. The apparatus includes a focusing lens for focusing a laser beam generated by a laser generator, and a hologram for converting the focused beam into a parallel beam, both the lens and hologram being disposed between the laser generator for generating the laser beam and the hologram disc for irradiating the parallel beam as a diffracted beam.

3 Claims, 2 Drawing Sheets

HOLOGRAPHIC LASER BEAM SCANNING APPARATUS

BACKGROUND OF THE INVENTION

1. Field of the Invention

This invention relates to a holographic laser beam scanning apparatus, and more particularly to a holographic laser beam scanning apparatus which permits astigmatism to be corrected by conforming a wave front of a collimated laser beam to a wave front of a laser beam used in making a hologram of a hologram disc.

2. Description of the Prior Art

Holographic laser beam scanning apparatuses are generally used in a variety of electronic products, for example, a laser beam printer, a bar code reader, a laser display, etc., which utilize a laser beam, and in recent years the range of use of such apparatuses has been progressively enlarged.

The known holographic laser beam scanning apparatus is of the type shown in FIG. 3 of the accompanying drawings, in which a laser beam B outputted from a laser generator 1 passes through a collimator 2 to be converted into a parallel beam, which is then reflected at an angle of 90 degrees by means of a reflecting mirror 3 to a hologram disc 4. The hologram disc 4 is rotatingly driven by a motor 6 to scan the reflected beam L incident on the hologram 5 of the disc, as a diffracted beam W having a given angle of diffraction, thereby forming a focus at a point P.

This prior apparatus however has a drawback in that since a wave front of the laser beam generated by the laser generator 1 and incident on the hologram disc 4 does not exactly coincide with a wave front of the laser beam used in making the hologram constituting the hologram disc, the beam diffracted through the hologram includes astigmatism created due to discordance of the wave fronts, so that a focus having a desired size may not be obtained. Therefore, when the beam is used in apparatuses needing precise scanning, precision and reliability of operation of the apparatus may be decreased.

Such a problem is caused by the following fact. In order to make the hologram, parallel light $L_1$ and a focusing spherical wave $W_1$ having a focus at a given point $P_1$ are directed to the hologram 5 at a given angle $\alpha_1$, as shown in FIG. 4. When the parallel beam is incident on the thus formed hologram 5 in the holographic laser beam scanning apparatus shown in FIG. 3, the diffracted beam passed through the hologram 5 has astigmatism resulting from discordance of beam L generated by the laser generator 1 and incident on the hologram 5 through the collimator 2 and the reflecting mirror 3.

SUMMARY OF THE INVENTION

The present invention has been devised in view of the above-mentioned prior art apparatus, and particularly to eliminate the disadvantages thereof, and has as an object to provide a holographic laser beam scanning apparatus including a separate hologram placed at a position at which a laser beam generated by a laser generator is displaced to be directed in the form of a parallel beam to a hologram of a hologram disc, so that a wave front of the laser beam incident on the hologram of the disc coincides with a wave front of a laser beam used in making the hologram.

To achieve the above object, there is provided according to one form of the present invention a holographic laser beam scanning apparatus comprising a laser beam a hologram for collimating the laser beam focused by the focusing lens to convert it into a parallel beam, and a hologram of a hologram disc for irradiating the parallel beam as a diffracted beam having a given angle of diffraction.

BRIEF DESCRIPTION OF THE DRAWINGS

The invention will now be described further, by way of example, with reference to the accompanying drawings, in which.

DESCRIPTION OF THE PREFERRED EMBODIMENT

Figure 1:
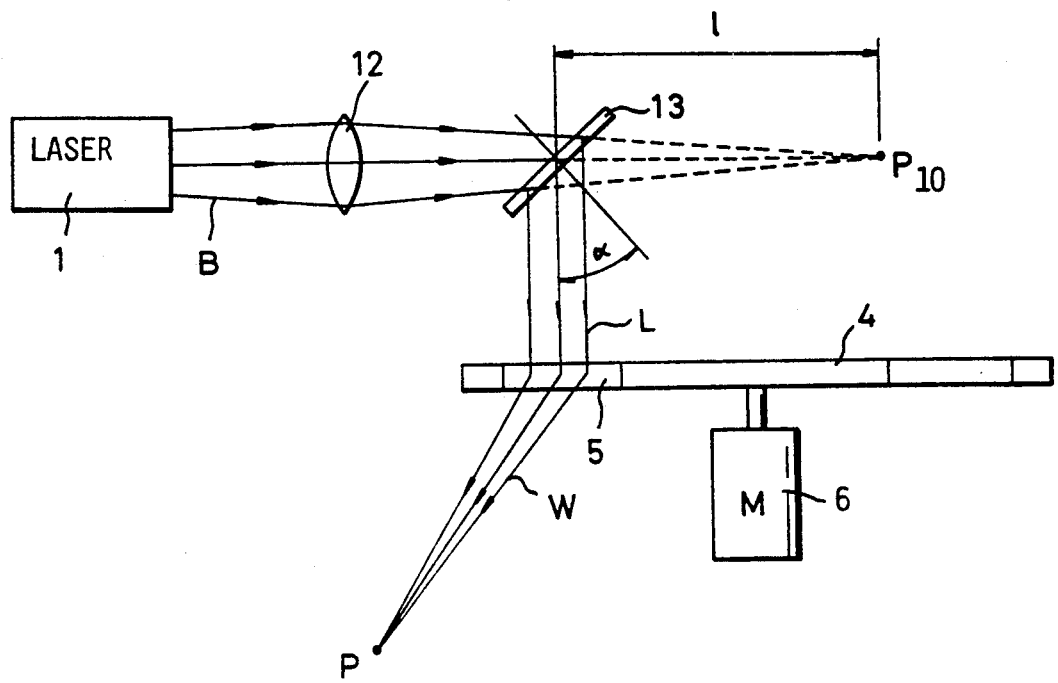
FIG. 1 is a schematic view illustrating the overall structure of a holographic laser beam scanning apparatus according to the present invention.

Referring to FIG. 1 diagrammatically illustrating the overall structure of a holographic laser beam scanning apparatus according to the present invention, a laser beam B generated and outputted by a laser generator 1 passes through a focusing lens 12 to be focused on a given point, i.e., a focus $P_{10}$ of the focusing lens.

The laser beam focused by the focusing lens 12 is incident on a first hologram 13 disposed at any predetermined position between the focusing lens and the focus $P_{10}$ to be converted into a parallel beam L having a given angle $\alpha$ with respect to a vertical axis of the hologram 13, which parallel beam is incident on a second hologram 5 of a hologram disc 4 driven by a motor 6.

Then, the beam incident on the hologram 5 is irradiated as a diffracted beam W having a given angle of diffraction, thus being focused on a fixed point P, as in the prior art.

The principle by which the focused laser beam is converted into the parallel beam through the hologram 13 will be described below. First, the hologram 13 for use in the apparatus of the present invention is made by directing parallel light $L_2$ and a focusing spherical wave $W_2$ focused on a given point $P_2$ to the hologram 13 at a given angle $\alpha_2$, as shown in FIG. 2.

Figure 2:
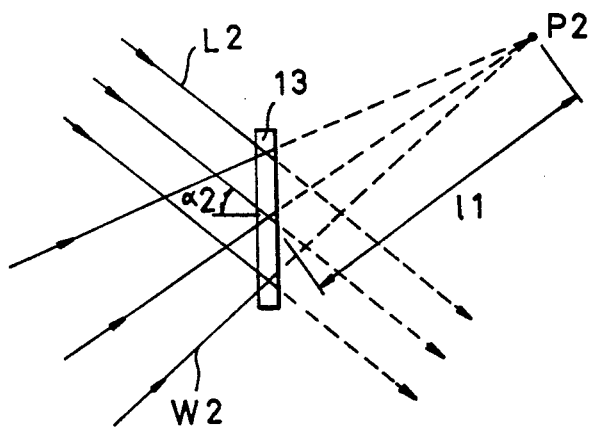
FIG. 2 is a view showing the manner of making a hologram being one of the essential parts of the present invention.
Figure 3:
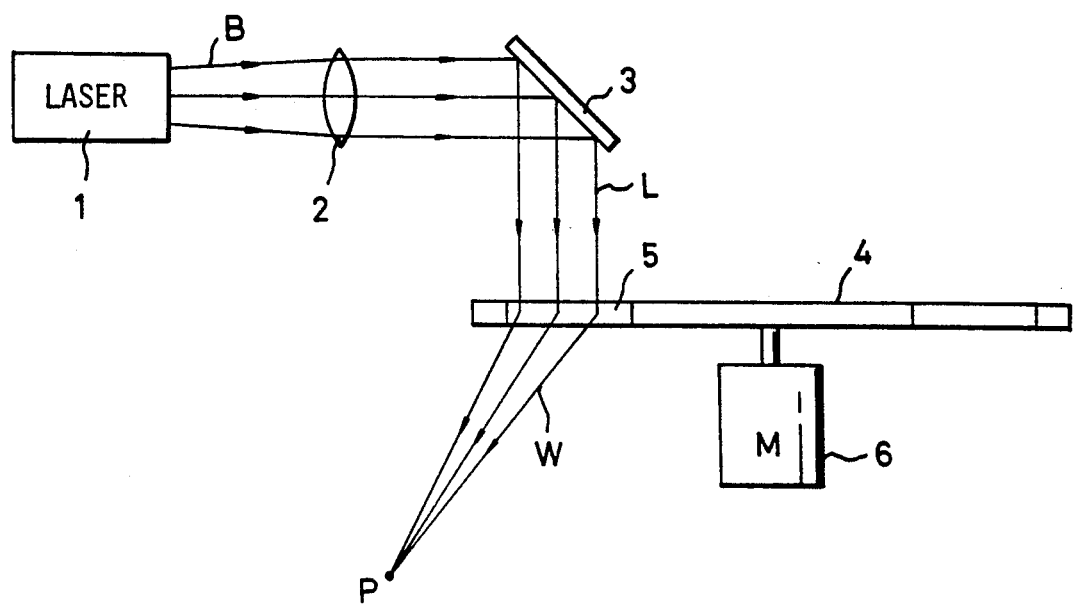
FIG. 3 is a schematic view illustrating the overall structure of an apparatus according to the prior art.
Figure 4:
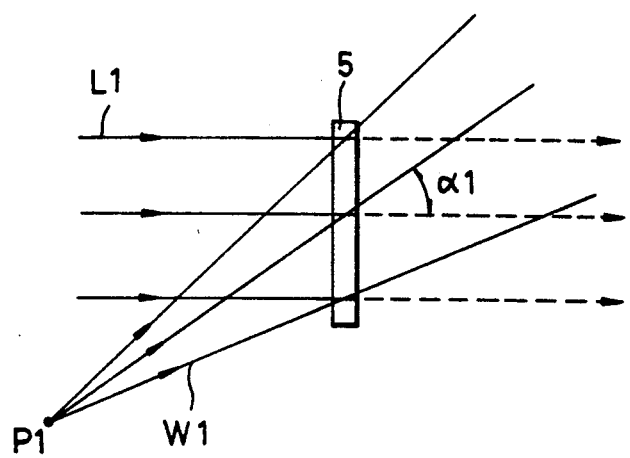
FIG. 4 is a view showing the manner of making a hologram of a hologram disc.

With the hologram thus made, since the distance $l_1$ between the center point of the hologram 13 and the focus $P_2$ of the focusing spherical wave and the given angle $\alpha_2$, as shown in FIG. 2, are equal respectively to the distance l between the center point of the hologram 13 and the focus $P_{10}$ of the beam focused by the focusing lens 12 and the given angle $\alpha$, as shown in FIG. 1, the laser beam is converted into the parallel beam L by passing through the hologram 13. That is, the distance $l_1$ to the focus $P_2$ and of FIG. 2, and the distance to the focus $P_{10}$ and the angle $\alpha$ of the hologram 13 used respectively in the apparatus of FIG. 1 are equal. Therefore, irradiation of the parallel beam L produced by passing through the hologram 13 is effected with the same optical system as that of the parallel light $L_1$ used in making the hologram 5 of the hologram disc 4, as shown in FIG. 4. Thus, since the wave front of the parallel beam incident on the hologram of the hologram disc coincides with the wave front of the laser beam used in making the hologram, the laser beam diffracted by the hologram disc does not create astigmatism, but is precisely focused on a desired point, whereby precise scanning may be accomplished.

From the foregoing description, it can be seen that the present invention provides an advantage over the prior art in that since the astigmatism created by the hologram disc during the scanning of the laser beam is removed, the precise scanning of the laser beam may be effected, thereby resulting in enhanced precision and reliability of the apparatus using the laser beam.

Having described but a single embodiment of this invention, it will be apparent that many changes and modifications can be made therein without departing from the spirit and scope of the invention as defined in the appended claims.

What is claimed is:

1. A holographic laser beam scanning apparatus comprising:
   a laser generator for outputting a laser beam;
   a focusing lens for focusing the laser beam;
   a first hologram formed by directing thereto a first parallel light beam and a spherical wave focused on a given point, said first hologram collimating the laser beam focused by said focusing lens to convert it into a second parallel light beam parallel to said first parallel light beam; and
   a second hologram comprising a hologram disc receiving said second parallel beam and irradiating a diffracted beam having a given angle of diffraction.

2. A holographic laser beam scanning apparatus as claimed in claim 1, in which said first hologram is disposed at a position whereby said second parallel light beam is incident on said second hologram, a wave front of the second parallel light beam incident on said second hologram coinciding with a wave front of the first parallel light beam used in making said first hologram.

3. A holographic laser beam scanning apparatus comprising:
   a laser generator for outputting a laser beam;
   a focusing lens for focusing said laser beam at a first point;
   a first hologram located at a distance 1 from said first point, said hologram being formed by directing to said first hologram
       a first parallel light beam making an angle $\alpha_2$ to a line perpendicular to a surface of said first hologram; and
       a spherical wave focused on a second point located at a distance $l_1$ from said first hologram;
   said first hologram collimating the laser beam focused by said focusing lens to convert it into a second parallel light beam making an angle $\alpha$ with respect to said line perpendicular to the surface of said hologram, the distance 1 being equal to the distance $l_1$, and the angle $\alpha_2$ being equal to the angle $\alpha$; and
   a second hologram comprising a hologram disc receiving said second parallel light beam and irradiating a diffracted beam having a given angle of diffraction.

* * * * *